United States Patent [19]

Lyall

[11] Patent Number: 5,000,502
[45] Date of Patent: Mar. 19, 1991

[54] VEHICLE WITH LOAD CARRYING COMPARTMENTS

[75] Inventor: Rodney Lyall, Middlesbrough, England

[73] Assignee: Cleveland County Council, Middlesbrough, England

[21] Appl. No.: 357,020

[22] Filed: May 25, 1989

[51] Int. Cl.$^5$ ............................................. B60R 11/06
[52] U.S. Cl. ................................ 296/26; 296/37.6
[58] Field of Search ........................... 296/26, 37.5

[56] References Cited

U.S. PATENT DOCUMENTS

| | | | |
|---|---|---|---|
| 2,329,419 | 9/1943 | Reed | 296/26 X |
| 2,490,014 | 12/1949 | Brand | 296/26 |
| 2,784,027 | 3/1957 | Temp | 296/26 X |
| 2,893,780 | 7/1959 | Ervine | 296/26 X |
| 4,375,306 | 3/1983 | Linder | 296/26 X |
| 4,397,497 | 8/1983 | Alonzo, Jr. et al. | 296/26 |
| 4,705,315 | 11/1987 | Cherry | 296/37.6 X |
| 4,784,429 | 11/1988 | Hodges | 296/26 X |
| 4,830,242 | 5/1989 | Painter | 296/37.6 X |

FOREIGN PATENT DOCUMENTS

| | | | |
|---|---|---|---|
| 3503967 | 8/1986 | Fed. Rep. of Germany | 296/37.6 |
| 1053230 | 2/1954 | France | 296/26 |
| 376002 | 4/1964 | Switzerland | 296/26 |

Primary Examiner—Johnny D. Cherry
Assistant Examiner—Joseph D. Pape
Attorney, Agent, or Firm—Rodman & Rodman

[57] ABSTRACT

A novel form of vehicle, particularly suitable for use as an emergency tender, includes a chassis upon which are mounted one or more "inner" load-carrying compartments over the longitudinal axis of the chassis and one or more "outer" load-carrying compartments further from the longitudinal axis. The compartments are relatively movable parallel to the axis so as to expose the inner compartments to access from the side of the vehicle. Thus the vehicle may be constructed in a relatively compact form which can be extended to allow access to its inner storage area.

6 Claims, 2 Drawing Sheets

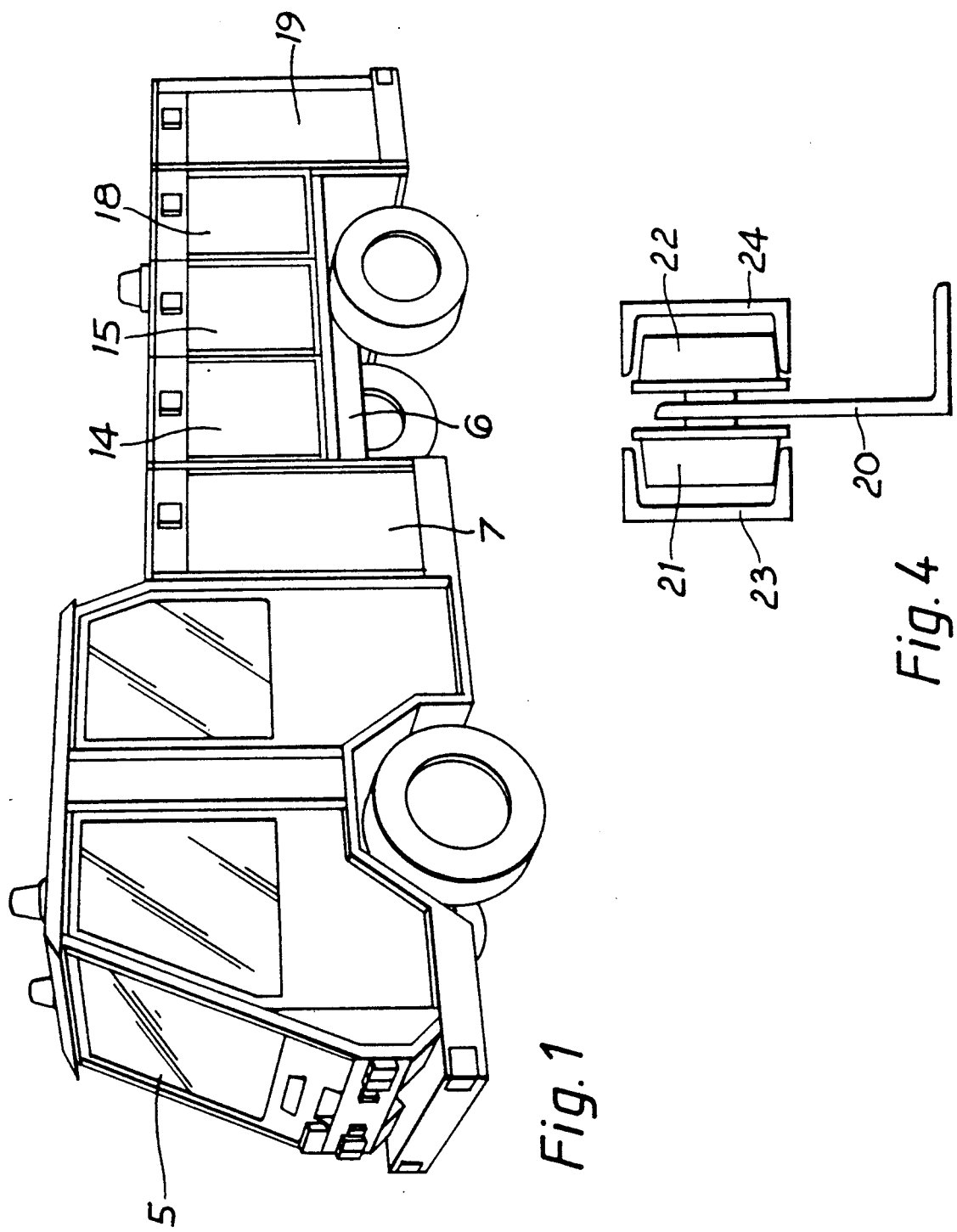

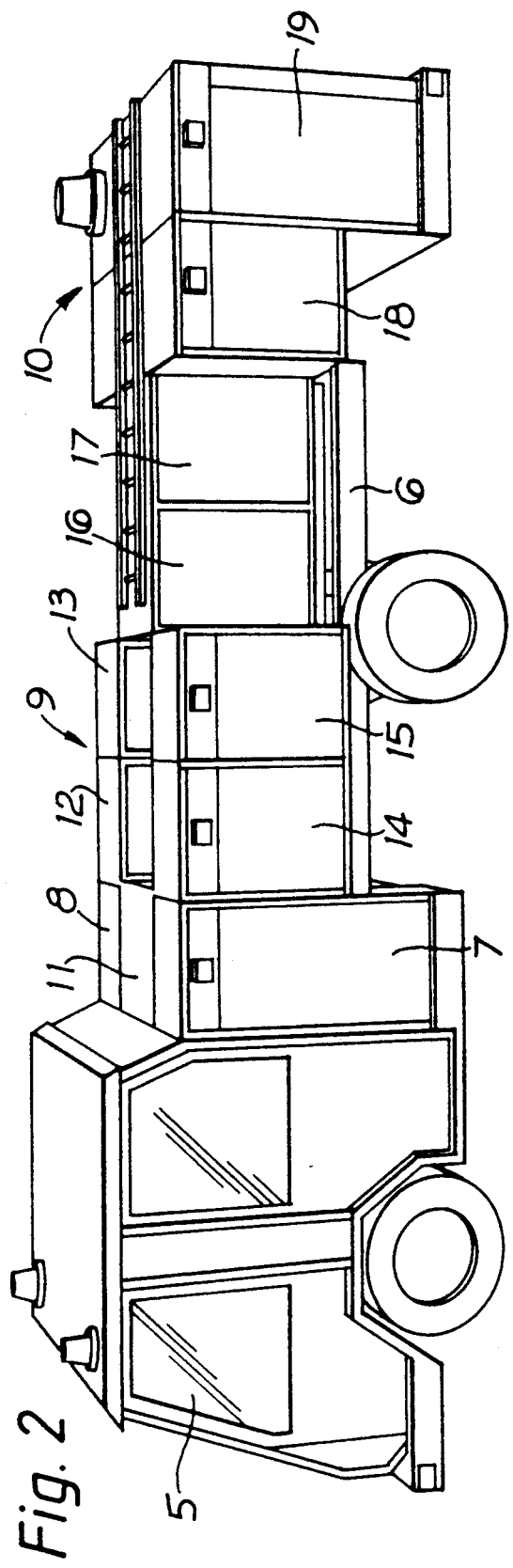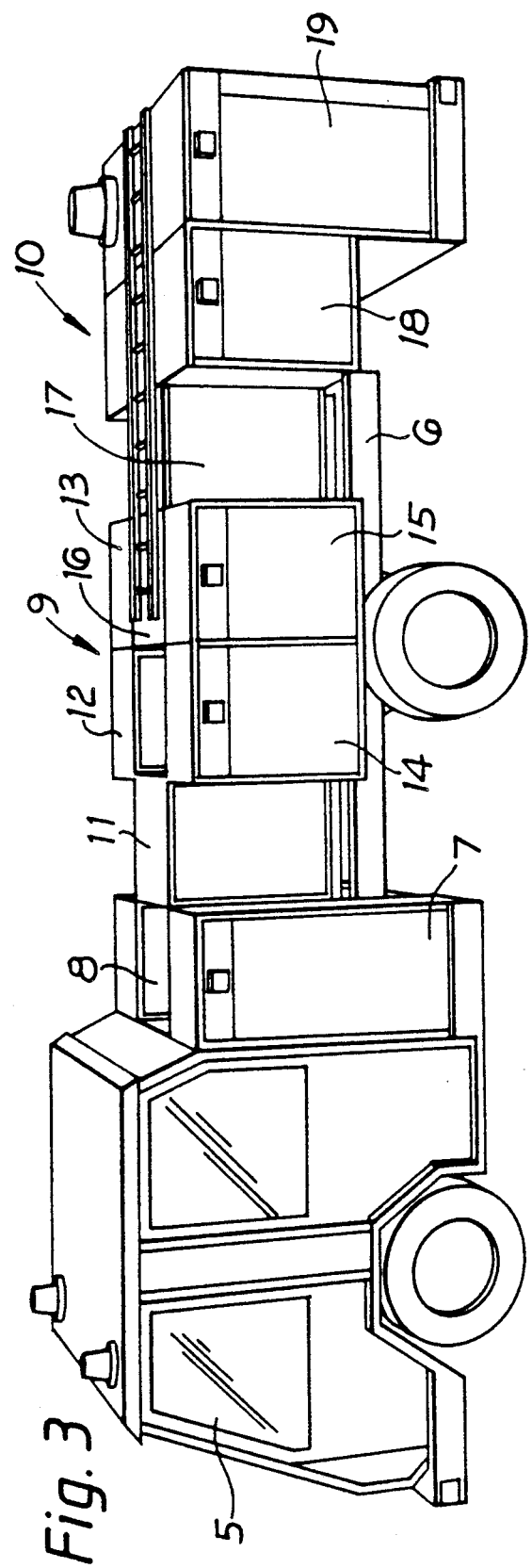

VEHICLE WITH LOAD CARRYING COMPARTMENTS

BACKGROUND OF THE INVENTION:

1. Field of the Invention

The present invention relates to a novel form of road vehicle, which has been devised to meet the requirements of an emergency tender designed to deal with a wide variety of incidents but is of value for many other purposes.

2. Description of the Prior Art

Emergency vehicles such as those operated by fire brigades and other services may be called upon to provide support in diverse locations for dealing with a range of incidents ranging from fires and road traffic accidents to chemical spillages and emergencies in the countryside and in the home. To cope adequately with so many different eventualities, the vehicle must carry a large quantity of equipment of many types. Thus a typical emergency tender may be a covered vehicle with items of equipment distributed around its inner walls. Access to that equipment is inevitably restricted by the need to reach it from inside the vehicle and the carrying capacity of the vehicle is in turn limited by the need to provide such interior access. A review of a range of available vehicles leads to the conclusion that there is a need for an emergency tender affording improved access to a high-capacity load, while not unduly increasing the size of the vehicle.

It is an object of the present invention to provide a vehicle which can meet that need.

SUMMARY OF THE INVENTION

The vehicle according to the present invention comprises a chassis having a longitudinal axis, a first load-carrying compartment mounted upon said chassis within the region of said longitudinal axis, a second load-carrying compartment mounted upon said chassis in a position further from said longitudinal axis, said first and second load-carrying compartments being relatively movable between a first relative position wherein access to said first load-carrying compartment is impeded by said second load-carrying compartment and a second relative position wherein said first load-carrying compartment is accessible from the side of the vehicle. For the sake of succinctness, the first load-carrying compartment will be referred to hereinafter as the "inner" compartment and the second load-carrying compartment will be referred to as the "outer" compartment, although these words are not intended to imply that one compartment is necessarily surrounded by the other.

DESCRIPTION OF THE PREFERRED EMBODIMENTS

In its most simple form, the vehicle according to the invention may comprise just two such compartments. In that form, the outer compartment may simply be mounted at one side of the inner compartment, although it is much preferred that the outer compartment be designed to extend on either or both sides of the inner compartment. However, in a preferred form, the vehicle comprises at least two inner compartments, which may be connected together or mutually separable, and at least two outer compartments, which also may be connected together or mutually separable.

By relative movement of the inner and outer compartments, access to the inner compartment or compartments is gained or enhanced. The relative movement may be achieved by movement of either or both of the inner and outer compartments respectively along a fixed chassis. For example the inner compartment(s) may be mounted fixedly upon the chassis and the outer compartment(s) may move along the chassis. If the overall length of the outer compartment(s) is less than that of the inner compartment(s), the outer compartment(s) may be moved within the length of the chassis so as to expose the inner compartment(s) or to expose progressively each one of two or more inner compartments. In order to use the carrying capacity of the vehicle to the maximum extent, however, it is preferred that the overall lengths of the inner and outer compartments respectively be substantially equal and that the inner compartment(s) be exposed by movement of at least one inner or outer compartment beyond the end of the chassis. While such movement has the effect of extending the overall length of the vehicle, that extending is only necessary when access to an inner compartment is required, which is only when the vehicle is stationary, for loading purposes and/or at the scene of the emergency. Thus the overall length of the vehicle in transit is unchanged.

The relative movement of the inner and outer compartments may be effected in any desired manner, for example by cranking the respective compartments together and apart. However, it is much preferred that the relative movement be effected by means of wheels, rollers, slides and/or rails. In particular, it is preferred to provide rollers or wheels on the chassis engaging rails on the movable compartment(s), or rollers or wheels on the compartment(s) engaging rails on the chassis.

The relative movement may quite conveniently be effected manually. As an alternative, the movement may be effected electrically or preferably hydraulically, for example by taking power from the source by which the vehicle itself is normally driven. If desired, a suitable interlock may be provided to ensure that the relative movement of the compartments, especially where this results in an extending of the vehicle, can only take place when the vehicle is stationary and/or to ensure that the vehicle cannot be driven when in an extended condition.

BRIEF DESCRIPTION OF THE DRAWINGS

The invention will now be further described, and further optional features will be made apparent, by reference to the accompanying drawings, which illustrate, by way of example only, one preferred embodiment of the vehicle according to the present invention and wherein:

FIG. 1 is a perspective view of the vehicle in an unextended condition;

FIG. 2 is a perspective view of the vehicle in a first extended condition;

FIG. 3 is a perspective view of the vehicle in a second extended condition; and

FIG. 4 is a detailed end elevation to a larger scale showing the manner of mounting of the movable components of the vehicle body upon the chassis.

Referring to the drawings, the illustrated vehicle is an emergency tender, devised for use by the fire service for example. The vehicle comprises a driving cab 5 for carrying service personnel, which is mounted upon a wheeled chassis 6. Also mounted on the chassis 6 are a fixed pair of stowage lockers 7 and 8 and two slidable stowage units designated generally by the reference numerals 9 and 10 respectively. The unit 9 comprises five separate compartments, namely an inner compartment 11 which in the unextended condition of the vehicle lies between the lockers 7 and 8, and four outer compartments 12-15. The unit 10 comprises two inner compartments 16 and 17 and two further compartments 18 and 19, which extend across the full width of the vehicle and to which access is provided from both sides of the vehicle.

Two support rails in the form of steel angle sections run parallel to each other fore-and-aft along the opposite sides of the chassis, one of these (the left-hand rail 20 viewed from the rear of the vehicle) being shown in FIG. 4. Along the opposite upper sides of each of the rails are arranged a number of bronze rollers, of which rollers 21 and 22 are visible in FIG. 4. Each of the units 9 and 10 carries a pair of longitudinal steel channel sections 23 and 24, which engage the rollers 21 and 22 and permit the units 9 and 10 to slide independently along the chassis 6 and to overlap each other in the unextended condition of the vehicle.

The manner of operation of the vehicle is apparent from the drawings. The emergency tender drives to the site of use in its condition shown in FIG. 1. In that condition, the compartments 7, 8, 12 to 15, 18 and 19 are readily accessible. To obtain access to equipment stowed in compartments 16 and 17, the unit 10 is slid rearwards as shown in FIG. 2. Access to compartment 11 is achieved by sliding the unit 9 rearwards as shown in FIG. 3.

In a modified form of the illustrated vehicle, additional load capacity is obtained by providing one or more further compartments, located fore and/or aft of the rear wheels of the vehicle, below the levels of the compartments 14, 12 and 18 and mounted upon the sides of the compartments 7, 8 and/or 19 respectively.

While the illustrated vehicle is specifically designed for use as an emergency tender, it is of course suitable in general for conveying equipment and/or goods of any kind. In suitably modified forms, the vehicle according to the invention may be designed as a general goods vehicle or for conveying refrigerated goods, for example.

I claim:

1. A vehicle incorporating a chassis having a longitudinal axis mounted upon wheels for transportation in a direction parallel to said longitudinal axis, said vehicle having at least two inner load carrying compartments mounted upon said chassis in a position lying over said longitudinal axis, said inner compartments being accessible only from the side of said chassis, at least two outer load carrying compartments mounted upon said chassis in a position spaced from said longitudinal axis and also being accessible only from the side of said chassis, said inner and outer compartments respectively being mounted for relative movement in a direction generally parallel to said longitudinal axis of said chassis between a first relative position in which access to at least one of said inner compartments is impeded by at least one of said outer compartments and a second position wherein said at least one inner compartment is accessible from the side of the chassis, unimpeded by said outer compartments.

2. A vehicle according to claim 1, wherein said at least one inner compartment is fixed relative to said chassis and said at least one outer compartment is movable in a direction generally parallel to said longitudinal axis of said chassis.

3. A vehicle according to claim 1, wherein said relative movement of said compartments in a direction generally parallel to said longitudinal axis of said chassis is determined by rollers or wheels engaging linear rails.

4. A vehicle according to claim 3, wherein said rollers or wheels are mounted for rotation upon said chassis and said rails are mounted on the underside of the movable compartment or compartments.

5. A vehicle according to claim 1 wherein said relative movement of said inner and outer compartments entails movement of at least one compartment to a position beyond the end of the vehicle chassis.

6. A vehicle according to claim 1, specially equipped for dealing with emergencies.

* * * * *